US009752097B2

(12) United States Patent
Turunc et al.

(10) Patent No.: US 9,752,097 B2
(45) Date of Patent: Sep. 5, 2017

(54) METHODS AND COMPOSITIONS FOR IMPROVING OIL RECOVERY IN CORN PROCESSING

(71) Applicant: GENERAL ELECTRIC COMPANY, Schenectady, NY (US)

(72) Inventors: Umit Turunc, Trevose, PA (US); Michael James Aucutt, Marion, IA (US); Charles Sinko, Trevose, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/029,813

(22) PCT Filed: Oct. 15, 2013

(86) PCT No.: PCT/US2013/064956
§ 371 (c)(1),
(2) Date: Apr. 15, 2016

(87) PCT Pub. No.: WO2015/057191
PCT Pub. Date: Apr. 23, 2015

(65) Prior Publication Data
US 2016/0340608 A1    Nov. 24, 2016

(51) Int. Cl.
*C11B 13/00* (2006.01)
*C11B 1/10* (2006.01)

(52) U.S. Cl.
CPC ............... *C11B 13/00* (2013.01); *C11B 1/10* (2013.01); *Y02W 30/74* (2015.05)

(58) Field of Classification Search
CPC ................................. C11B 13/00; C11B 1/10
USPC ........................................................ 554/179
See application file for complete search history.

(56) References Cited

U.S. PATENT DOCUMENTS

| | | | |
|---|---|---|---|
| 4,744,904 A | 5/1988 | McAninch et al. | |
| 6,228,400 B1 | 5/2001 | Lee et al. | |
| 6,488,946 B1 | 12/2002 | Milius et al. | |
| 8,192,627 B2 | 6/2012 | Gallop et al. | |
| 8,283,484 B2 | 10/2012 | Cantrell et al. | |
| 2012/0245370 A1* | 9/2012 | Sheppard ................ | C11B 1/10 554/204 |
| 2016/0115425 A1 | 4/2016 | Blankenburg et al. | |

FOREIGN PATENT DOCUMENTS

| | | | |
|---|---|---|---|
| CA | 2789917 A1 * | 3/2013 | ............ C09K 8/588 |
| CN | 102965942 A | 3/2013 | |
| WO | 2013135643 A1 | 9/2013 | |
| WO | WO 2015/057191 A1 | 4/2015 | |

OTHER PUBLICATIONS

Wang et al., "Effect of Low-Shear Extrusion on Corn Fermentation and Oil Partition", Journal of Agricultural and Food chemistry, vol. No. 57, pp. 2302-2307, Mar. 25, 2009.
Eckard et al., "Enzyme Recycling in a Simultaneous and Separate Saccharification and Fermentation of Corn Stover: A Comparison Between the Effect of Polymeric Micelles of Surfactants and Polypeptides", Bioresource Technology, vol. No. 132, pp.202-209, Jan. 16, 2013.
PCT Search Report and Written Opinion issued in connection with corresponding PCT Application No. PCT/US2013/064956 on Apr. 8, 2014.
Balzer, D. and Luders, H., "Nonionic Surfactants Alkyl Polyglucosides", pp. 2-14, 2000.
The Dow Chemical Company, Triton B and CG Alkyl Polyglucoside Surfactants, Product Safety Assessment, Dow 6 pages, 2010.
Bergfeld et al., Cosmetic Ingredient Review, Final Safety Assessment, "Decyl Glucoside and Other Alkyl Glucosides as Used in Cosmetics", 31 pages, Dec. 19, 2011.
Database WPI, Week 201401, Apr. 1, 2014, Thomson Scientific, London, GB, AN 2013-K00861, XP002722596 & CN 102 965 942 A (Wuijang Hongqiangwei Textile Co., Ltd.) Mar. 13, 2013, Abstract.
Savic, S., et al., "Behind the Alkyl Polyglucoside-Based Structures: Lamellar Liquid Crystalline and Lamellar Gel Phases in Different Emulsion Systems" Alkyl Polyglucosides, From Natural-Origin Surfactants to Prospective Delivery Systems Chapter 2, pp. 21-52, 2014.
US Office Action issued in related U.S. Appl. No. 15/139,451 on Dec. 27, 2016.

* cited by examiner

*Primary Examiner* — Deborah D Carr
(74) *Attorney, Agent, or Firm* — Wegman, Hessler & Vanderburg

(57) ABSTRACT

Methods and composition are provided for recovering oil from an oil containing mixture or emulsion. The invention is particularly applicable for recovery of oil from corn in a corn to oil process. The process and compositions comprise a combination of two non-ionic surfactants i) and ii). The non-ionic surfactant i) is a non-ionic surfactant comprising a polyol derived from a sorbitol, a sorbitan, or isosorbide. The non-ionic surfactant ii) is an ester of a) polyethylene glycol and b) a fatty acid. In accordance with the methods, the combination of surfactants i) and ii) is brought into contact with a process stream mixture existing in a corn to ethanol process.

15 Claims, No Drawings

METHODS AND COMPOSITIONS FOR IMPROVING OIL RECOVERY IN CORN PROCESSING

FIELD OF INVENTION

The invention pertains to methods and compositions for improving the separation of oil from oil containing mixtures and emulsions. More particularly, the invention pertains to methods and compositions for improving the yield of corn oil in corn to ethanol processing systems.

BACKGROUND OF THE INVENTION

Over the past few decades, ethanol has become increasingly important as an alternative fuel. One advantage to use of ethanol fuel is that it can be produced from corn. Ethanol from corn is produced by either the wet-milling or dry-milling process. During the milling process, the corn kernels are ground and the main constituents (starch, gluten, germ, and fiber) are separated. The starch is further processed to make ethanol. The residue of the ethanol process is referred to as stillage. Stillage contains a mixture of solids, oil, and water. A portion of the stillage is processed to extract the corn oil incorporated therein.

In the dry milling operation, a "beer" mash is made as a result of the fermentation process. The ethanol is removed from the "beer" in a stripper or distillation column. The remaining mash is referred to as whole stillage. This whole stillage is then subjected to centrifuging or other separation techniques to result in a thin stillage and a wet cake. This thin stillage is further processed in an evaporator or the like to remove excess water and produce a concentrated thin stillage stream called "syrup". Typically, this syrup has a moisture content of between about 15-90 wt %. Increasingly, the syrup is treated via heat and centrifuge or other separation techniques to separate corn oil for industrial usage of the corn oil such as in biodiesel fuel.

SUMMARY OF THE INVENTION

In certain illustrative embodiments, the invention pertains to a method for recovering oil from an oil containing mixture or emulsion wherein the mixture or emulsion is contacted with a combined treatment of non-ionic surfactants i) and ii) wherein i) is a non-ionic surfactant comprising a polyol derived from sorbitol, a sorbitan or isosorbide. In some embodiments, the non-ionic surfactant ii) is an ester of a) polyethylene glycol and b) a fatty acid.

In other exemplary embodiments, the non-ionic surfactant i) is an alkoxylated sorbitan alkylate, and the non-ionic surfactant ii) is a polyethylene glycol ester of a fatty acid. In certain embodiments, the non-ionic surfactant i) is a polyethoxylated sorbitan monooleate and the non-ionic surfactant ii) is polyethylene glycol dioleate.

Other illustrative embodiments of the invention are directed to methods for recovering oil from corn in corn to oil processes wherein the oil and solids are present in a process stream mixture. Here, the method comprises adding to the process stream mixture an oil separation aid comprising i) a non-ionic surfactant comprising a polyol derived from a sorbitol, a sorbitan, or isosorbide, and ii) an ester of a) polyethylene glycol and b) a fatty acid. The process stream mixture may, for example, be present in a whole stillage process stream, a thin stillage process stream, in an evaporator, in a thin stillage syrup system, or in the feed or makeup water to a corn to ethanol fermentation process. In further illustrative embodiments, the separation aid, that is, combined surfactants i) and ii), has an overall HLB of about 10 to about 14. More particularly, the HLB may be from about 11.5-13.5.

In some embodiments, the non-ionic surfactant i) is an alkoxylated sorbitan alkylate wherein the chain length of the alkylate is about 6-24 carbon atoms. More particularly, the non-ionic surfactant i) is a polyethoxylated sorbitan monooleate having about 5-100 moles of ethoxylation. Some embodiments include moles of ethoxylation of about 10-30, and more specifically about 20 moles of ethoxylation.

In one aspect of the invention, the non-ionic surfactant ii) is a polyethylene glycol ester of a fatty acid having from about 12 to about 24 carbon atoms. More specifically the fatty acid is selected from the following group: lauric, palmitic, stearic, and oleic acids; particularly the fatty acid is oleic acid. In another embodiment the non-ionic surfactant ii) is a diester of polyethylene glycol and oleic acid; specifically polyethylene glycol dioleate and the molecular weight of the polyethylene glycol moiety is from about 200 to 1500 dalton units, such as 200-1,000 dalton units. In some embodiments of the invention, the non-ionic surfactant ii) is polyethylene glycol dioleate wherein the molecular weight of the polyethylene glycol is about 400 dalton units. More specifically, the polyethylene glycol dioleate is manufactured by the esterification method, wherein the fatty acid is reacted with the polyethylene glycol, with an excess ratio of fatty acid to polyethylene glycol so as to favor the formation of the diester compound. Also, the use of polyethylene glycol of a specified molecular weight, such as 400 dalton units, as a starting material in the esterification process for producing non-ionic surfactant ii) results in a plurality of molecules with a relatively narrower molecular weight distribution. Also, in other specific embodiments of the invention, the non-ionic surfactant i) is polyethoxylated sorbitan monooleate having about 20 moles of ethoxylation.

Other aspects of the invention are directed toward corn oil separation enhancement compositions comprising a carrier liquid and non-ionic surfactants i) and ii) that are dispersed or dissolved in the carrier liquid. The carrier liquid may comprise water or other polar solvent. The non-ionic surfactant i) may be an alkoxylated sorbitan alkylate, and the non-ionic surfactants ii) may be a polyethylene glycol ester of a fatty acid. In more specific embodiments, the corn oil separation enhancement composition comprises as the non-ionic surfactant component i) a polyethoxylated sorbitan monooleate having from about 20-40 moles of ethoxylation present. In some cases, the composition comprises a non-ionic component ii) that is a diester of polyethylene glycol and of oleic acid, specifically polyethylene glycol dioleate, and the molecular weight of the polyethylene glycol moiety is from about 200 to 1500 such as 200 to 1000 dalton units. In specific embodiments of the invention the non-ionic surfactant ii) is polyethylene glycol dioleate wherein the molecular weight of the polyethylene glycol is about 400 dalton units. More specifically the polyethylene glycol dioleate is manufactured by the esterification method, wherein the fatty acid is reacted with the polyethylene glycol, with an excess ratio of fatty acid to polyethylene glycol so as to favor the formation of the diester compound. Also, the use of polyethylene glycol of a specified molecular weight, such as 400 dalton units, as a starting material in the esterification process for producing non-ionic surfactant ii) results in a plurality of molecules with a relatively narrower molecular weight distribution. Also, in other specific embodiments of the invention, the non-ionic surfactant i) is polyethoxylated sorbitan monooleate having about 20 moles of ethoxylation.

DETAILED DESCRIPTION

In one aspect of the invention, a combination of non-ionic surfactants i) and ii) is applied to a process stream mixture that is present in a corn to oil process. By process stream mixture, we mean that the combination of non-ionic surfactants is brought into contact with any oil/solids/water mixture present in such corn to oil processes or into contact with any solids or liquid that will ultimately be brought in contact with such oil/solids/water mixture. As examples, the phrase "process stream mixture" includes whole stillage process streams, thin stillage process streams, evaporator streams, syrup streams, and the feed or make up to a corn to ethanol fermentation process such as fermentation feed, addition to a beer well or the like.

In one embodiment, from about 50-5000 ppm of the combination of surfactants i) and ii) is fed to the process stream based upon the weight of the process stream mixture. More particularly, the feed rate is between about 100-2500 ppm of the combination with an even more exemplary addition range being from about 250-1250 ppm. The present disclosure envisions and covers any sub-range or ranges within 50-5000 ppm, and especially any sub-range or ranges within 250-1250 ppm.

In some embodiments, the weight ratio of the surfactants i) and ii) to be fed to the process stream mixture is about 5:1 to 1:5 component i) to component ii). In other embodiments, the components i) and ii) are present in an amount of about 1:1 to about 3:1 i) and ii). The present disclosure envisions and covers any sub-range or ranges within 5:1 to 1:5, and especially any sub-range or ranges within 1:1 to 3:1.

As to the first non-ionic surfactant, component i), these are known and are reported in U.S. Published Patent Application 2012/0245370 A1 ('370), which is incorporated by reference herein in its entirety. These surfactants i) are commercially available from a variety of sources. As is reported in the '370 published application, the non-ionic surfactants i) are functionalized polyols comprising alkoxylated sorbitan monoalkylates, alkoxylated sorbitan dialkylates, alkoxylated sorbitan trialkylates and mixtures thereof. In an embodiment of the present invention, the alkoxylated alkylates of sorbitan have an alkyl chain length of from about 6 to about 24 carbons, more particularly from about 8 to about 18 carbons. The alkoxylated sorbitan alkylates may be alkoxylated esters of sorbitan. In an embodiment, the alkoxylated alkylates of sorbitan may be alkoxylated with from about 5 to about 100 moles of alkyl oxide, particularly from 5 to 60 moles, particular from 10 to 30 moles, also particular 20-40, and more particular from 12 to 30 for each mole of sorbitan. Another equivalent way to describe "moles" is as units of alkyl oxide. Thus, the alkoxylated alkylates of sorbitan may have from about 5 to about 100 units of alkyl oxide. Exemplary alkyl oxides are ethylene oxide and propylene oxide or a combination thereof. Exemplary alkoxylated alkylates of sorbitan are sorbitan monolaurate, sorbitan monooleate, sorbitan monopalmitate or sorbitan monostearate that have been alkoxylated with less than 50 moles of ethylene oxide or propylene oxide or a combination thereof, relative to the moles of sorbitan. More exemplary alkoxylated alkylates of sorbitan are sorbitan monolaurate, sorbitan monooleate, sorbitan monopalmitate or sorbitan monostearate that have been ethoxylated with from about 10 moles to about 30 moles of ethylene oxide or propylene oxide or a combination thereof relative to the moles of sorbitan, more particularly the alkoxylated sorbitan alkylates are alkoxylated esters of sorbitan.

Particularly are sorbitan monolaurate, sorbitan monooleate, sorbitan monopalmitate or sorbitan monostearate that have been alkoxylated with approximately 20 moles of ethylene oxide or propylene oxide or a combination thereof per mole of sorbitan.

Exemplary surfactants useful as surfactant component i) are the polyethoxylated sorbitan monooleates wherein from about 10-30 moles of ethoxylation are present per mole of sorbitan. Noteworthy species within this group include Polysorbate 80 (having 20 moles of EtO per mole of sorbitan).

Non-ionic surfactants ii) may include an ester of a) polyethylene glycol and b) a fatty acid. For example, the non-ionic surfactants ii) may include an ester or a diester of a) polyethylene glycol and b) a fatty acid. Exemplary non-ionic surfactants ii) that may be mentioned include polyethylene glycol (PEG) dioleate, PEG dilaurate, PEG dipalmitate, PEG distearate, PEG monooleate, PEG monolaurate, PEG monopalmitate, PEG monostearate. In some exemplary embodiments, the PEG moiety of the surfactant ii) has a molecular weight of from about 200 to 4,000, with other embodiments having a PEG molecular weight of about 200 to 1500 or 200-1000. Even more specific embodiments have a PEG mw of from about 200 to about 600. One particularly noteworthy surfactant ii) is the fatty acid may have from 8 to 24 carbon atoms and can include one or more unsaturations. The fatty acid may have from 12 to 24 carbon atoms.

After the combined surfactant i) and ii) treatment is added to the process stream mixture, oil can be separated therefrom via conventional separation techniques such as centrifuging, decanting, or solvent extraction.

In another aspect of the invention, it has been discovered that the blend of surfactants i) and ii) can be chosen to customize the combined or blended HLB of the surfactant addition to particular corn to oil process stream mixtures. Preliminary data suggests that the overall blended average HLB of the i) and ii) combination should be from about 10 to about 14, with an even more specific exemplary range being about 11.5 to about 13.5.

It is apparent that the above invention is described specifically with regard to its efficacy in enhancing corn oil separation in corn to ethanol process streams. However, the invention is also applicable broadly to oil separation enhancement from any oil/solids/water mixture or emulsion.

EXAMPLES

The present invention will be further described in the following examples which should be viewed as being illustrative and should not be construed to narrow the scope of the invention or limit that scope to any particular invention embodiments.

Syrups from eight different corn to ethanol processes were chosen. Each syrup was analyzed for pH, solids, FOG (fats, oil, grease) and oil droplet size (microns). For each syrup, 100 ml of syrup was heated at 180° F. Each sample was then dosed with various ppm treatment levels of the tested surfactants. Heated samples were then poured into a 12 ml centrifuge vials and spun for 15 minutes at 6,000 rpm. The resulting corn oil extracted was then volumetrically measured in milliliters and expressed as milliliters of oil released per 100 mls of syrup. Each procedure was performed twice to determine repeatability.

Results are given in the following tables:

TABLE 1

Tested syrups

| Syrup # | pH | % S | FOG | Drop Size (um) | Avg. drop size (um) | Phytase |
|---|---|---|---|---|---|---|
| S1 | 5.00 | 55.81 | 531.00 | 2-12.7 | 7.35 | N |
| S2 | 3.50 | 52.14 | 561.00 | 3-12.7 | 7.85 | N |
| S3 | 5.00 | 46.02 | 519.00 | 2-6.3 | 4.15 | N |
| S4 | 5.00 | 54.54 | 527.00 | 5-12.7 | 8.85 | Y |
| S5 | 4.00 | 58.55 | 524.00 | 1-4.0 | 2.50 | Y |
| S6 | 5.00 | 37.71 | 521.00 | 2-6.0 | 4.00 | Y |
| S7 | 4.00 | 40.10 | 523.00 | 44-60 | 52.00 | N |
| S8 | 4.80 | 37.50 | 586.00 | 30-80 | 55.00 | N |

TABLE 2

Corn oil extraction tests

| Syrup # | P80 500 ppm | P80 1000 ppm | P60 500 ppm | P60 1000 ppm | P400DO 500 ppm | P400DO 1000 ppm | CA1 500 ppm | CA1 1000 pm | CA2 500 ppm | CA2 1000 ppm | CA3 500 ppm | CA3 1000 ppm |
|---|---|---|---|---|---|---|---|---|---|---|---|---|
| S1 | 2.00 | 4.00 | 1.00 | 1.00 | 0.50 | 0.50 | 10.00 | 12.00 | 2.00 | 4.00 | 3.00 | 3.50 |
| S2 | 7.00 | 8.00 | 0.50 | 0.50 | 0.50 | 0.50 | 11.00 | 12.00 | 5.00 | 6.00 | 3.00 | 8.00 |
| S3 | 1.00 | 2.00 | 1.00 | 1.00 | 0.50 | 0.50 | 2.00 | 4.00 | 1.00 | 2.00 | 1.00 | 2.00 |
| S4 | 1.00 | 2.00 | NA | NA | NA | NA | 1.50 | 4.00 | 2.00 | 6.00 | 1.00 | 3.00 |
| S5 | 3.00 | 10.00 | NA | NA | NA | NA | 3.00 | 12.00 | 10.00 | 13.00 | 4.00 | 5.00 |
| S6 | 1.00 | 2.00 | NA | NA | NA | NA | 1.00 | 2.50 | 1.00 | 3.00 | 1.00 | 1.50 |
| S7 | 2.00 | 3.00 | NA | NA | NA | NA | 5.00 | 10.00 | 3.00 | 5.00 | 3.00 | 6.00 |
| S8 | 4.00 | 10.00 | NA | NA | NA | NA | 4.50 | 12.00 | 5.00 | 7.00 | 4.00 | 6.00 |

P80 = Polysorbate 80 – HLB = 15.0 – (polyoxyethylene) 20 sorbitan monooleate.
P400 DO = polyethylene glycol 400 dioleate acid ester – HLB = 8.3.
CA-1 = 75% P80/25% P400DO – HLB = 13.3.
CA-2 = 50% P80/50% P400 DO – HLB = 11.7.
CA-3 = 25% P80/75% P400DO$_2$ – HLB = 10.0.
P60 = Polysorbate 60 – HLB = 14.9 – (polyoxyethylene) 20 sorbitan monostearate.

Syrups from eight different corn to ethanol processes were tested. As indicated by the pH, solids, FOG (fats, oil, grease) and oil droplet size analysis, there are differences in the chemical and physical characteristics of the syrups.

Due to the inherent variability of the syrup from different corn mills, it has been difficult to find surfactants and combinations of surfactants which have broad applicability. However, the present invention has solved this problem with the use of an inventive combination of two types of surfactants that work on the syrups tested. Specifically, as the tables above show, for every single syrup, at least two combinations of the two surfactants tested exhibited synergistic results which are better than each surfactant alone. Moreover, the results are especially surprising since one of the surfactants, polyethylene glycol 400 dioleate, was ineffective in extracting corn oil from the syrup. In fact, after evaluating it on the first three syrups, it was not tested further by itself on the remaining syrups due to its lack of efficacy.

Surprisingly, when polyethylene glycol 400 dioleate was combined in different ratios with Polysorbate 80, the combinations CA1, CA2 and CA3 showed surprising results. For every dosage tested, there was synergism in at least two different syrups where the results were better than each surfactant alone. This is particularly surprising in view of the ineffectiveness of polyethylene glycol 400 dioleate by itself.

Thus, for each syrup tested there are at least two synergistic combinations of the two surfactants, and for each combination of surfactants, there are at least two syrups where there is synergism. This solution provides the ability to treat different syrups effectively in spite of the difference in properties from syrup to syrup.

Although this invention has been described and disclosed in relation to certain embodiments, obvious equivalent modifications and alterations thereof will become apparent to ordinary skill in the art upon reading the specification and appended claims. Accordingly, the presently disclosed invention is intended to cover all such modifications and alterations and is limited only by the scope of the claims that follow.

The invention claimed is:

1. A method for recovering oil in a corn to ethanol process wherein oil and solids are present in a process stream mixture, said method comprising adding to said process stream mixture an oil separation aid, said oil separation aid comprising i) a non-ionic surfactant comprising a polyol derived from a sorbitol, a sorbitan, or isosorbide and ii) a non-ionic surfactant selected from the group consisting of polyethylene glycol (PEG) dioleate, PEG dilaurate, PEG dipalmitate, PEG distearate, PEG monooleate, PEG monolaurate, PEG monopalmitate, and PEG monostearate.

2. A method as recited in claim 1 wherein said process stream mixture is present in a whole stillage process stream, a thin stillage process stream, in an evaporator, in a syrup stream, or in feed or make up water to a corn to ethanol fermentation process.

3. A method as recited in claim 1 wherein said separation aid has a HLB of about 10 to about 14.

4. A method as recited in claim 1 wherein i) is an alkoxylated sorbitan alkylate.

5. A method as recited in claim 4 wherein i) is an ethoxylated sorbitan and the chain length of said alkylate is about 6 to 24 carbon atoms.

6. A method as recited in claim 5 wherein i) is polyethoxylated sorbitan monooleate.

7. A method as recited in claim 6 wherein i) has about 5-100 units of ethoxylation.

8. A method as recited in claim 7 wherein i) has about 10-30 units of ethoxylation.

9. A method as recited in claim 1 wherein ii) is PEG dioleate wherein the molecular weight of the PEG is from about 200-1500 dalton units.

10. A method as recited in claim 9 wherein the molecular weight of the PEG is about 400 dalton units.

11. A method as recited in claim 10 wherein i) is polyethoxylated sorbitan monooleate having about 20 moles of ethoxylation.

12. Corn oil separation enhancement composition comprising components i) and ii) wherein i) is an alkoxylated sorbitan alkylate and ii) is a non-ionic surfactant selected from the group consisting of polyethyleneglycol (PEG) dioleate, PEG dilaurate, PEG dipalmitate, PEG distearate, PEG monooleate, PEG monolaurate, PEG monopalmitate, and PEG monostearate.

13. Corn oil separation enhancement composition as recited in claim 12 wherein i) is a polyethoxylated sorbitan alkylate and the chain length of said alkylate is about 6 to 24 carbon atoms and wherein i) has 5-100 units of ethoxylation.

14. Corn oil separation enhancement composition as recited in claim 12, wherein ii) is PEG dioleate wherein the molecular weight of the PEG is from 200 to 1500 dalton units.

15. Corn oil separation enhancement composition as recited in claim 14, further comprising a carrier liquid wherein i) is a polyethoxylated sorbitan monooleate having from about 10-30 moles of ethoxylation present.

\* \* \* \* \*